United States Patent [19]
Hechel et al.

[11] Patent Number: 5,056,233
[45] Date of Patent: Oct. 15, 1991

[54] METHOD AND APPARATUS FOR MEASURING CROSS-TOE

[75] Inventors: Dennis L. Hechel, New Berlin; Peter A. Puetz, Waukesha; Gary R. Kercheck, Colgate, all of Wis.

[73] Assignee: Bear Automotive Service Equipment Company, New Berlin, Wis.

[21] Appl. No.: 532,908

[22] Filed: Jun. 4, 1990

[51] Int. Cl.5 .................... G01B 5/255; G01B 11/275
[52] U.S. Cl. ........................................ 33/288; 33/286; 33/203; 33/203.18; 356/155; 356/153
[58] Field of Search .................... 33/203.18, 288, 286, 33/203, 203.15; 356/155, 153, 152

[56] References Cited

U.S. PATENT DOCUMENTS

| 3,393,455 | 7/1968 | MacMillan | 356/155 |
| 3,865,492 | 2/1975 | Butler | 356/155 |
| 3,901,604 | 8/1975 | Butler | 356/152 |
| 4,095,902 | 6/1978 | Florer | 356/155 |
| 4,115,926 | 9/1978 | Hampton, Jr. et al. | 33/288 |
| 4,126,943 | 11/1978 | Seuften | 356/155 |
| 4,130,362 | 12/1978 | Lill et al. | 33/288 |
| 4,311,386 | 1/1982 | Coetsier | 356/155 |
| 4,319,838 | 3/1982 | Grossman et al. | 356/152 |
| 4,402,603 | 9/1983 | Lill | 33/288 |
| 4,440,495 | 4/1984 | Bergström et al. | 356/155 |
| 4,500,201 | 2/1985 | Lill | 356/155 |
| 4,594,789 | 6/1986 | Marino et al. | 33/288 |
| 4,718,759 | 1/1988 | Butler | 33/288 |
| 4,854,702 | 8/1989 | Stieff | 33/288 |

FOREIGN PATENT DOCUMENTS 8101047  4/1981  PCT Int'l Appl. ................. 356/155

Primary Examiner—William A. Cuchlinski, Jr.
Assistant Examiner—William C. Dowling
Attorney, Agent, or Firm—Kinney & Lange

[57] ABSTRACT

A wheel alignment system uses head units attached to each of the four wheels of an automotive vehicle. Angle measurements are taken using light sources and light sensors. Pitch sensors measure the pitch of the head units with respect to a horizontal plane. The head units are connected to the left and right front wheels of the automotive vehicle. The pitch information is used to compensate for errors in left and right cross-toe measurements between the left and right front wheels of the automotive vehicle.

22 Claims, 5 Drawing Sheets

METHOD AND APPARATUS FOR MEASURING CROSS-TOE

BACKGROUND OF THE INVENTION

The present invention relates to automobile wheel alignment systems In particular, the invention relates to a method and apparatus for measuring a cross-toe angle in a wheel alignment system.

Proper alignment of wheels in an automotive vehicle is important for proper handling of the vehicle and proper tire wear. In addition, the proper alignment of the wheels will decrease fuel consumption as well as increase vehicle safety. The wheel alignment parameters which are measured and adjusted in order to achieve proper wheel alignment are camber, caster, steering axis inclination and toe.

The toe angle of a wheel, at a specified wheel load or relative position of the wheel center with respect to a sprung mass, is the angle between a longitudinal axis and a line of intersection of wheel plane and road surface. The wheel is "toed-in" if the forward portion of the wheel is turned toward a central longitudinal axis of the vehicle, and "toed-out" if turned away. Accurate toe adjustment cannot be attained without properly calibrated measuring instruments.

Camber is defined as the angle which the wheel makes with respect to a vertical plane when looking at the wheel from either the front or the rear of the automobile. Any wheel of an automobile can have camber.

Caster is an angle which the steering axis of a steerable wheel (typically one of the front wheels) makes with respect to the vertical plane which is perpendicular to the longitudinal direction of the automobile.

Steering axis inclination (SAI) is the inclination of the steering axis with respect to a vertical plane which is parallel to the longitudinal direction of the automobile.

Toe was originally defined as the difference of the distance between the front edges of two opposite wheels and the distance between the rear edges of the same two wheels. Toe can also be defined in terms of an angular relationship of the plane of a wheel (perpendicular to its turning axis) relative to a predetermined longitudinal vehicle axis. When the forwardmost portions of a pair of adjacent wheels are closer together than the rear portions of those wheels, they are commonly referred to as in a "toe-in" condition. When the rear portions of wheels are closer together than the front portions, the condition is commonly referred to as "toe-out."

Camber is a tire wearing angle and also affects handling of the automobile. Caster and SAI do not affect tire wear, but are important for directional control. Toe is a tire wearing angle and also affects the position of the steering wheel required in order to maintain the automobile along a straight line.

Wheel alignment in an automobile wheel alignment system can be measured with angle sensors which use a light source and a light sensor mounted on head units which are coupled to the wheels of the automobile. The light source is aimed at the sensor and the sensor provides an output which represents an angular relationship between the sensor and the light source.

In measuring toe, however, if the light source or the sensor is tilted out of a horizontal plane, the tilt introduces an error into cross-toe angle measurements. (Cross-toe angle measurement refers to the toe angle measurement of an individual wheel).

It is desirable to lower the head units so that light from the light source is not blocked by obstructions such as front end air spoilers which may be present on, for example, a sports car. To clear an obstruction, typically a "drop block" is used by an operator of the automobile wheel alignment system. Drop blocks are used to couple the head units to the front wheels of the automobile under test. Drop blocks allow the head unit to be lowered in a vertical plane where an axis of the head unit remains parallel, although no longer co-axial, with an axis of the wheel. However, a minor deformity in the drop block arising during manufacturing or field use can introduce an error into alignment measurements. The drop blocks are also cumbersome and time consuming for the system operator to use.

Cross-toe angle sensors must also be leveled in a horizontal plane to obtain accurate cross-toe alignment measurements. Both with and without the use of drop blocks, the system operator must precisely align the head units in the horizontal plane. This is a source of errors in the alignment measurements, and is also time consuming for the operator.

There is continuing need for improved angle measurement systems which are easy for an operator to use and which provide more accurate measurements.

SUMMARY OF THE INVENTION

The present invention provides a wheel alignment system for measuring the angular relationship between the wheels of an automotive vehicle. More specifically, the invention provides a method and apparatus of measuring cross-toe angle in an automobile wheel alignment system which is easier to use and less susceptible to error.

In the present invention, the front head units can be tilted at an angle relative to the horizontal plane, and any errors this introduces into the cross-toe angle measurements are cancelled. The ability to tilt the front head units provided by the present invention, allows an operator to tilt the front head units to avoid obstacles to the cross-toe light beams, such as front end spoilers. Furthermore, the present invention allows an operator to obtain cross-toe angle measurements without the need to precisely level the front end head units in the horizontal plane, as required in prior art designs. This feature saves time for the system operator, avoids the use of drop blocks, and reduces the chance of an error in cross-toe angle measurements.

The invention includes four head units for mounting to the front left and right wheels, and rear left and right wheels of an automotive vehicle and a controller for operating the head units. Light beams are sent from front to back and back to front by each pair of left front and back and right front and back head units. Left and right front head units provide cross-toe measurements using front left to right and front right to left light beams If the front left or right head unit is tilted out of the horizontal plane, an error is introduced into the cross-toe angle measurement. In the present invention, the angle of the front left and right head units are measured relative to the horizontal plane using level (pitch) sensors. The outputs of the level sensors are received by the controller which calculates a correction factor. The controller uses this correction factor to remove the error introduced into the cross-toe measurement.

DETAILED DESCRIPTION OF THE PREFERRED EMBODIMENTS

Figure 1:
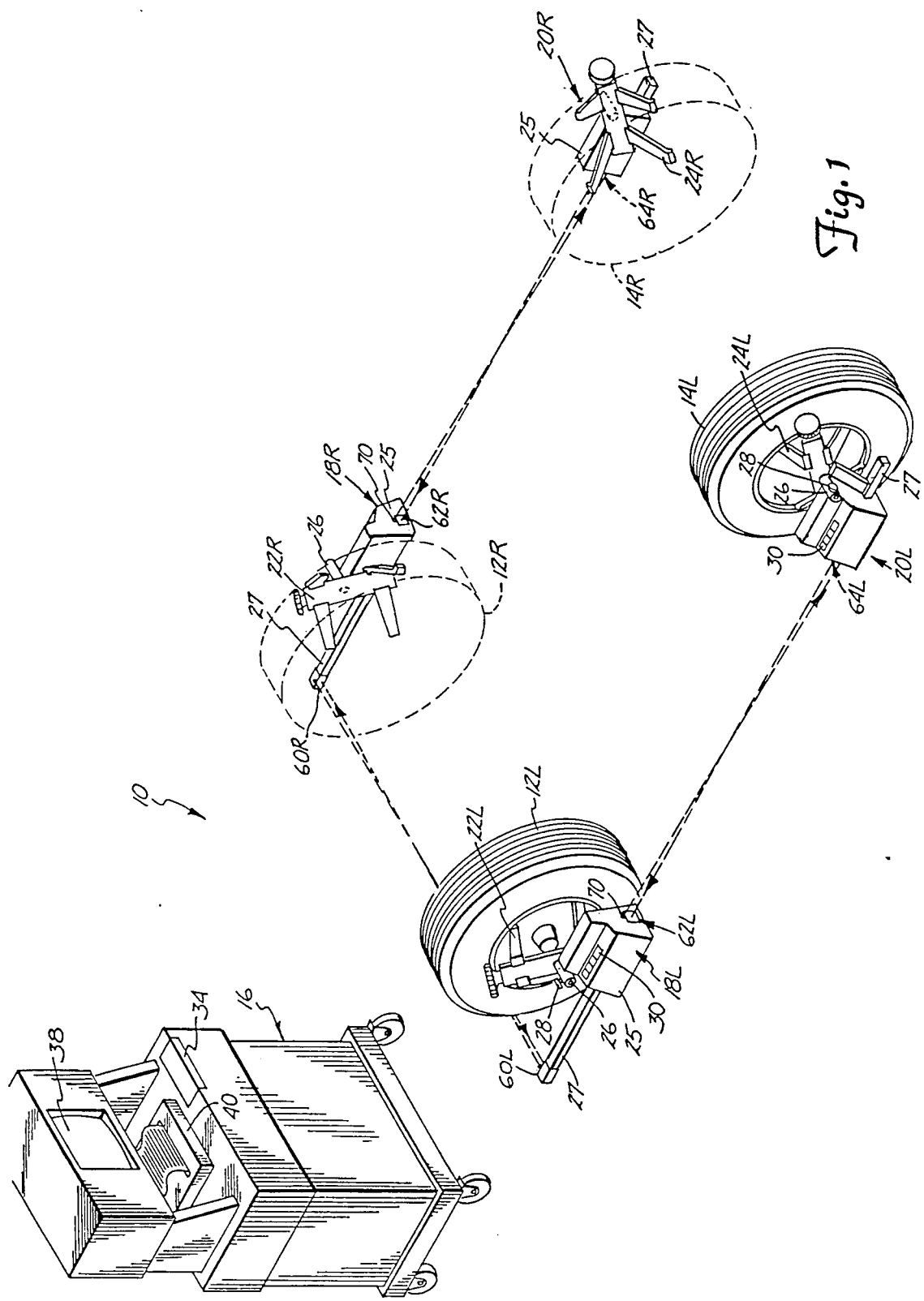
FIG. 1 is a perspective view of the alignment apparatus of the present invention.

In FIG. 1, wheel alignment system 10 of the present invention is used to measure the alignment of left front wheel 12L, right front wheel 12R (shown in phantom), left rear wheel 14L and right rear wheel 14R (shown in phantom) of an automotive vehicle. For clarity, the remaining portions of the vehicle are not shown. System 10 includes a main console 16, left and right front head units 18L and 18R, and left and right rear head units 20L and 20R. Head units 18L, 18R, 20L and 20R are connected to main console 16 by cables (not shown).

Head units 18L, 18R, 20L and 20R are supported on wheels 12L, 12R, 14L and 14R by rim clamps 22L, 22R, 24L and 24R, respectively. Rim clamps 22L, 22R, 24L and 24R are self-centering, four-leg rim clamps which fit a wide range of different wheel sizes without the need for special adapters. Each head unit (18L, 18R, 20L, 20R) includes a housing 25, a sleeve 26 and an arm 27. Sleeve 26 mounts over a spindle of the corresponding rim clamp. Each head unit (18L, 18R, 20L, 20R) is locked into position on the spindle of the corresponding rim clamp (22L, 22R, 24L, 24R) by spindle clamp 28. A set of switches 30 on housing 25 allows the mechanic to signal main console 16 that a measurement is made and to respond to messages displayed by main console 16.

Main console 16 includes keyboard 34 as an input device and has CRT display 38 and printer 40 as output devices. A power supply (not shown), which is located within main console 16, supplies power to a computer (not shown in FIG. 1) and its input and output devices, and also supplies power to head units 18L, 18R, 20L and 20R.

Main console 16 supplies data and instructions to the head units 18L, 18R, 20L and 20R and receives wheel alignment measurement values from each of the head units. Based upon these measurement values, computer 32 provides wheel alignment output values and other information to the operator through CRT display 38 and printer 40.

In wheel alignment system 10 shown in FIG. 1, there are a total of six angle sensor units used to measure toe angles. Front left head unit 18L carries a left-to-right sensor 60L and a front-to-rear sensor 62L. Left rear head unit 20R carries a rear-to-front angle sensor 64L.

The angle sensor units are arranged to operate in pairs. Sensors 60L and 60R are mounted at the front ends of arms 27 of front head units 18L and 18R and face one another. Sensor 62L is mounted at the rear end of housing 25 of head unit 18L and faces sensor 64L which is mounted at the front end of head unit 20L. Similarly, sensor 62R of head unit 18R faces sensor 64R of head unit 20R.

Figure 2:
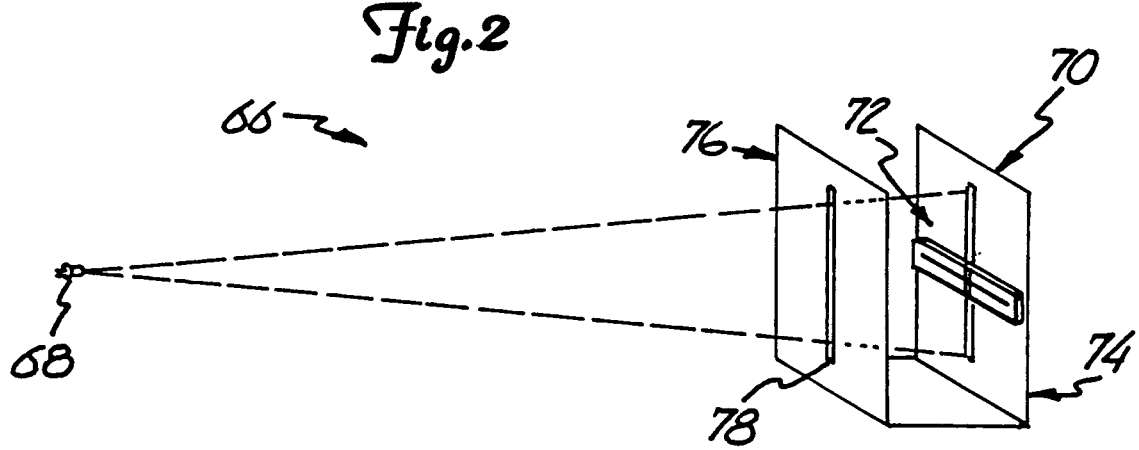
FIG. 2 is a perspective view of an angle sensor.

FIG. 2 is a perspective view of an angle sensor 66. Sensor 66 comprises a light source 68 and an optical bench 70. Light source 68 is coupled to one head unit, 18L for example, and optical bench 70 is mounted to another head unit, 18R for example. In such a configuration, angle sensor 66 measures cross-toe angle.

Optical bench 70 includes linear CCD 72 and frame 74. Frame 74 includes a mask 76, which defines a slit 78. Slit 78 is at a right angle to linear CCD 72. Slit 78 allows a portion of the light from light source 68 to fall upon linear CCD 72. The remaining portion of the light from light source 68 directed at linear CCD 72 is blocked by mask 76. FIG. 2 shows the relationship between light source 68 and optical bench 70 at an angle of 0 degrees.

Figure 3:
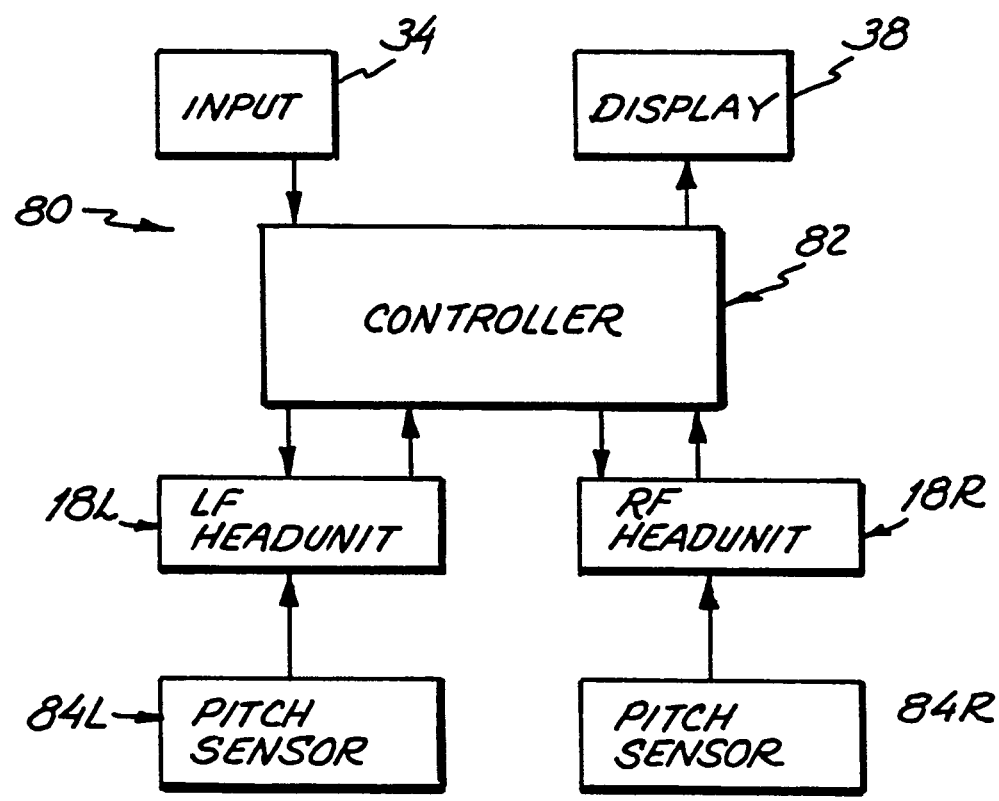
FIG. 3 is a block diagram of a wheel alignment system made in accordance with the present invention.

FIG. 3 is a block diagram 80 in accordance with the present invention. In FIG. 3, a controller 82 in main console 16 connects to input device 34, display 38 and left and right head units 18L and 18R. Each head unit 18L and 18R is connected to a pitch sensor 84L and 84R, respectively. Typically, controller 82 comprises a computer and head units 18L and 18R include microprocessors.

Pitch sensors 84L and 84R comprise glass vials which contain four electrical conductors and are filled with a conducting liquid. The pitch angle of the tilt sensor determines the degree to which each of the four electrical conductors is immersed in the conductive fluid. This changes the electrical resistance between the conductors. By measuring the electrical resistance between the four conductors, the pitch sensor can be used to determine the angle between a reference plane of the pitch sensor and the horizontal plane. A suitable pitch sensor is the SP5000 available from Spectron Glass and Electronics Inc., 595 Old Willets Path, Hauppauge, N.Y. 11788. This sensor provides two axes of measurement.

In accordance with the present invention, controller 82 calculates cross-toe angle measurements between left front head units 18L and right front head unit 18R. Based upon these cross-toe measurements and pitch information collected from pitch sensors 84L and 84R, controller 82 calculates correction factors for the cross-toe angle measurements. Controller 82 uses these correction factors to eliminate errors introduced into the cross-toe angle measurements due to the pitch angle relative to a horizontal plane of head units 18L and 18R. The steps of calculating the correction factors are explained below in more detail.

Figure 4:
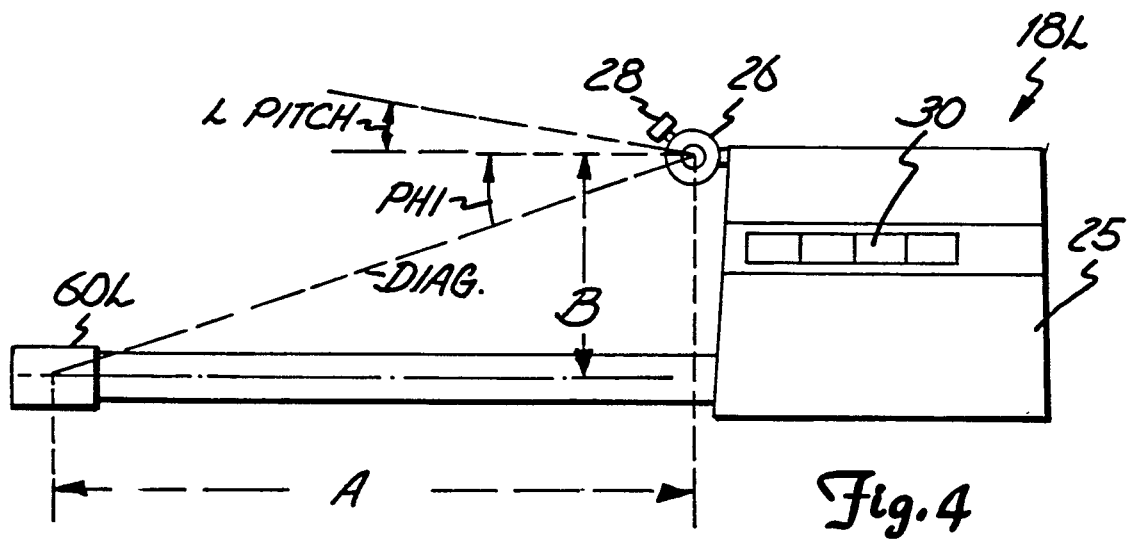
FIG. 4 is a side view of a head unit used in the present invention.

FIG. 4 is a side view of head unit 18L showing lengths A and B. Length B is the vertical element and length A is the horizontal element of the distance between sensor 60L and sleeve 26. Sleeve 26 is essentially co-axial with an axis of rotation of front left wheel 12L. Toe sensor 60L is a vertical distance B below the axis of rotation and a horizontal distance A laterally from the axis of rotation. As head unit 18L is tipped down about the axis of rotation through sleeve 26 so that sensor 60L is lowered, the horizontal distance A gets shorter and the vertical distance B gets longer. If head unit 18L is tipped up so that sensor 60L is raised, length B gets shorter and length A gets shorter. Such movement of toe sensor 60L causes a change in the toe reading. Without compensation, the sensitivity of sensor 60L is also affected by tilt.

In FIG. 4 Length Diag is the distance between the axis of head unit 18L and toe sensor 60L. Length Diag makes an angle with the horizontal plane of angle phi. Angle phi equals arctangent(B/A). The length Diag is equal to SQRT($A^2+B^2$). The horizontal length A is equal to Diag x cos(phi). If the head 18L is tipped downward to an angle of lfpitch, the new lateral distance A1 is equal to Diag x (cos(phi)−lfpitch). (Upward pitch is considered to be positive).

If the opposite head unit (18R) is tilted the same amount, the effect is canceled out. However, if this is not the case, then each toe sensor has been shifted different amounts. Tilt of the front head units causes an offset and a gain change in front cross-toe readings.

The offset is dependent upon the tread width of the vehicle, and the vertical distance between the sensor and the tread.

Figure 5A:
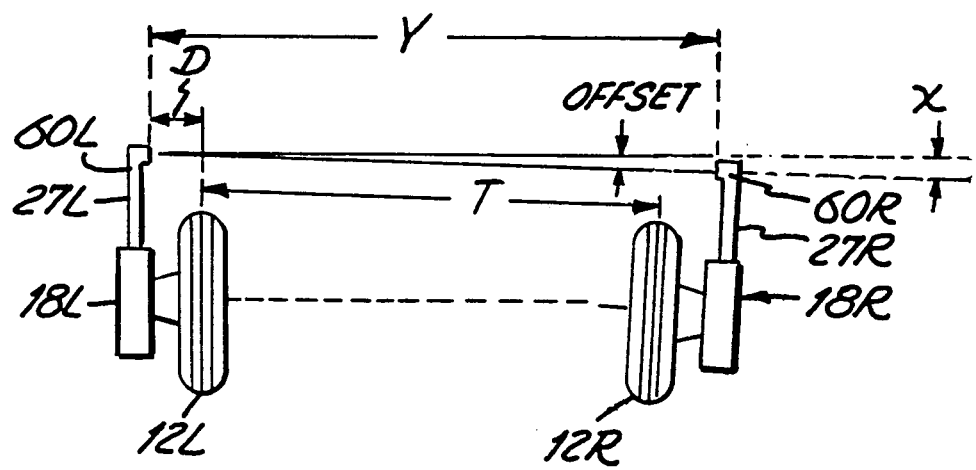
FIG. 5A and 5B are top and side views, respectively, of the left and right front wheels of an automobile and the left and right front head units used in the present invention.
Figure 5B:
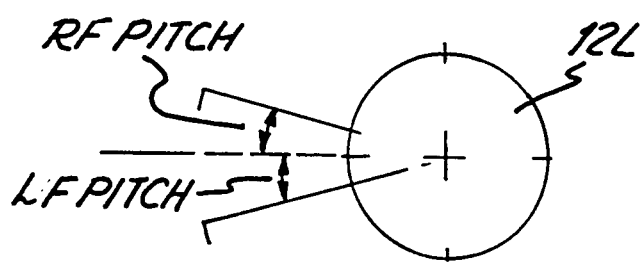

FIG. 5A and 5B show top and side views, respectively, of the left and right front wheels 12L and 12R. T is the tread width, D is the distance between the center of the tire tread and an angle sensor 60L or 60R. Left front head unit 18L is tilted from the horizontal plane at an angle of lfpitch. Right front head unit 18R is tilted from a horizontal plane at an angle of rfpitch. Because the two angles lfpitch and rfpitch are not equal in this example, offset angles are introduced between sensors 60L and 60R. Y is the distance between sensors 60L and 60R, and X is the length of the offset in the horizontal plane. These offset errors introduce errors into cross-toe measurements.

HORIZONTAL SEPARATION CORRECTION FACTOR

Figure 6:
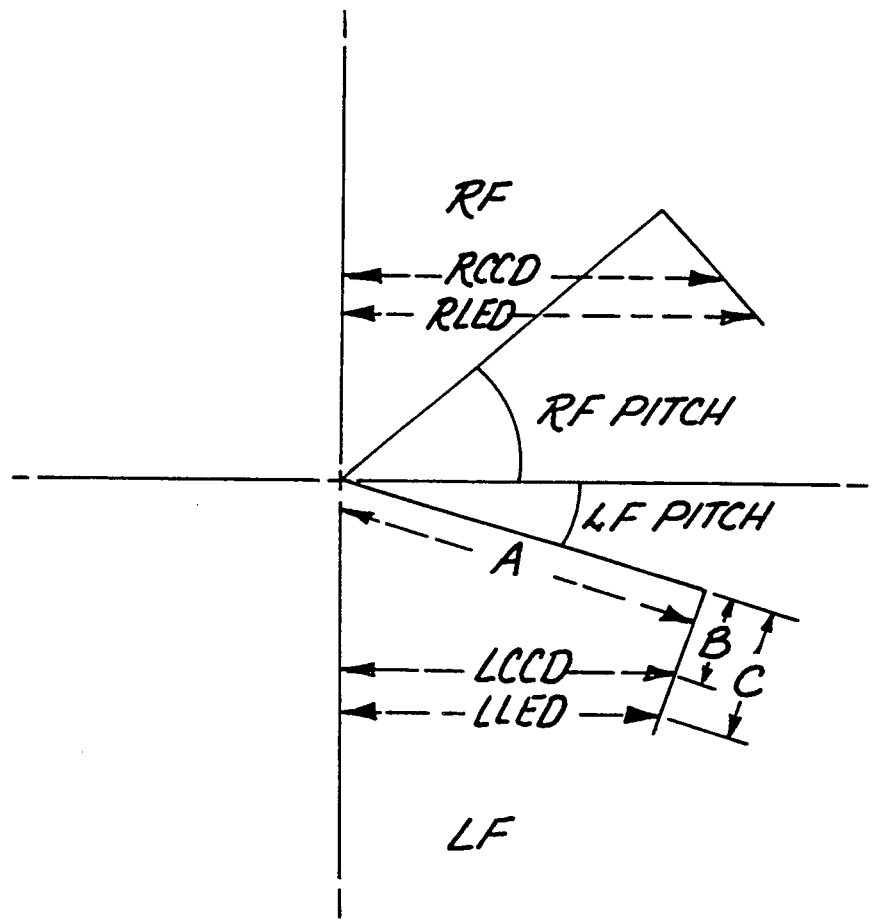
FIG. 6 is a geometrical representation of a side view of the left and right front head units.

Unequal tilt in the front wheel units 18L and 18R, will cause the separation of the light sources and light sensors along the wheel base (the front to back axis) of the car. Separation introduces offset errors (or angles) in the front toe readings. These offset errors can be compensated for using horizontal correction factors (or angles) $hoff_l$ and $hoff_r$. In FIG. 6, lfpitch is the pitch of the left front head unit 18L and rfpitch is the pitch of the right front head unit 18R with respect to a horizontal plane. Lccd and rccd are the distances of the CCDs (the light sensors) from the spindles (sleeves 26). Lled and rled are the distances of the LEDs (the light sources) from the spindles. A is the length of toe arm 27. B is the vertical distance between a CCD and the spindle and C is the vertical distance between the LED and the spindle. Lccd, lled, rccd and rled are calculated as follows:

$$lccd = A \times cos(lfpitch) + B \times sin(lfpitch) \qquad Eq1$$

$$lled = A \times cos(lfpitch) + C \times sin(lfpitch) \qquad Eq2$$

$$rccd = A \times cos(rfpitch) + B \times sin(rfpitch) \qquad Eq3$$

$$rled = A \times cos(rfpitch) + C \times sin(rfpitch) \qquad Eq4$$

Using the factors lccd, lled, rccd and rled, the horizontal offset angles shown in FIG. 5 can be calculated as follows:

$$hoff_l = atan[(lccd - rled)/(T+2D)] \qquad Eq5$$

$$hoff_r = atan[(rccd - lled)/(T+2D)] \qquad Eq6$$

Where T is the tread width, D is the distance between the edge of the tread width and the face of the sensor in the horizontal plane (see FIG. 5A), $hoff_l$ is the offset angle read by the left front head unit 18L and $hoff_r$ is the horizontal offset angle read by the right front head unit 18R.

VERTICAL SEPARATION CORRECTION FACTOR

Figure 7:
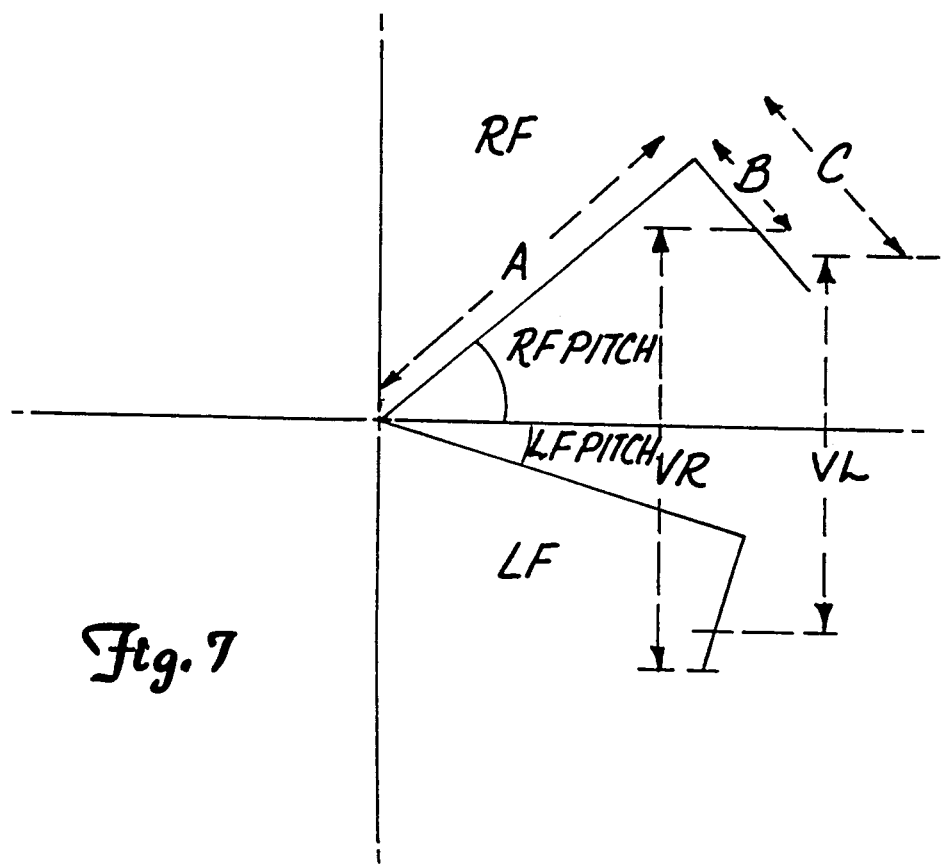
FIG. 7 is a geometrical representation of a side view of the left and right front head units.

Unequal pitch of the front left and right head units 18L and 18R also causes separation of the light sensors and light sources in the vertical direction. This separation causes the incoming light signal to enter slit 78 at a vertical angle. Since slit 78 itself is tilted, this will cause another offset. FIG. 7 shows a geometrical diagram of a side view of wheel units 18L and 18R used to describe the vertical offset component. The vertical separation of light source 68 and light sensor 72 can be computed using front left and right pitch angles lfpitch and rfpitch. FIG. 7 shows front left head unit 18L and front right head unit 18R. Lfpitch is the angle of the left front head unit with respect to the horizontal plane and rfpitch is the angle of the right front head unit with respect to the horizontal plane. The vertical distance from right front CCD to left front LED is vr, and the vertical distance from left front CCD to right front LED is vl. A is the length of the toe arm 27. B is the vertical distance between the CCD and the axis of rotation of the head unit (the spindle). C is the vertical distance between the LED and the axis of rotation of the head unit. Vertical distances vr and vl can be calculated as follows:

$$vl = [A \times sin(lfpitch) - B \times cos(lfpitch)] - [A \times sin(rfpitch) - C \times cos(rfpitch)] \qquad Eq7$$

$$vr = [A \times sin(rfpitch) - B \times cos(rfpitch)] - [A \times sin(lfpitch) - C \times cos(lfpitch)] \qquad Eq8$$

CAMBER COMPONENT OF VERTICAL SEPARATION

Figure 8:
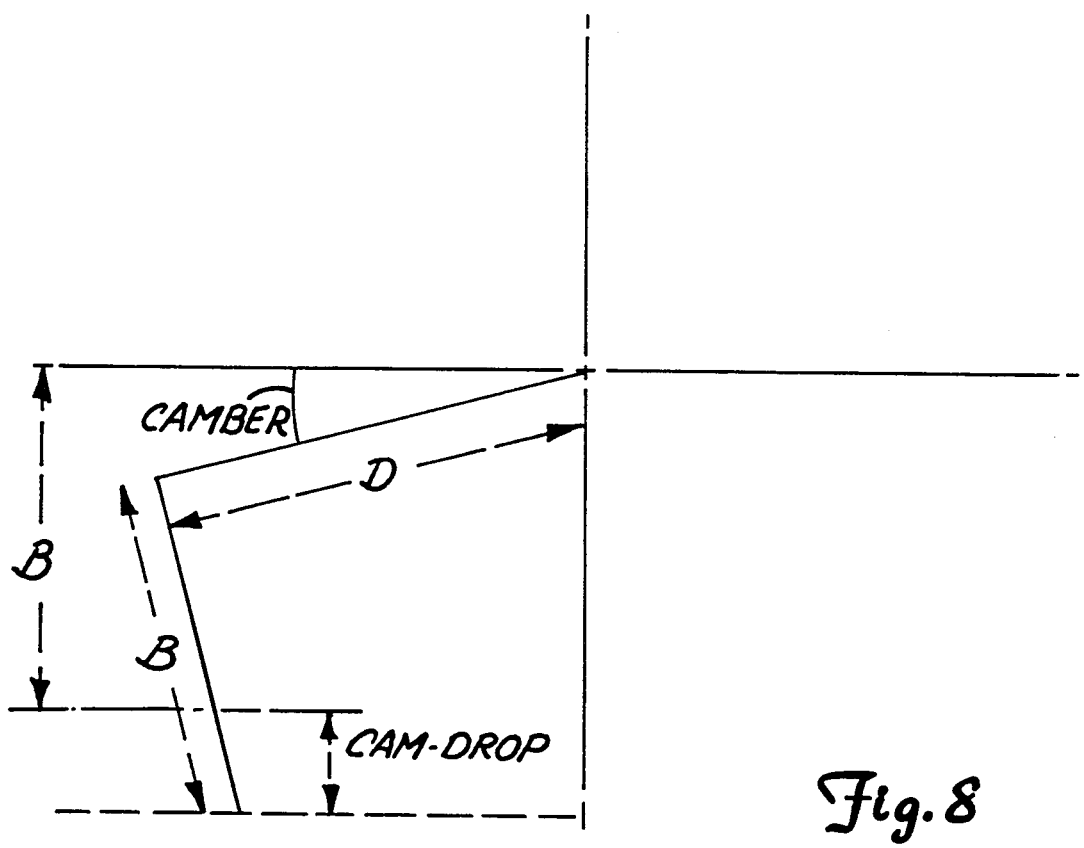
FIG. 8 is a geometrical representation of a front view of one of the head units.

Changes in the camber of the front wheels will also change the vertical separation of the front head units 18L and 18R. The camber component of vertical separation should also be taken into account to obtain accurate cross-toe measurements. FIG. 8 shows a front view of a head unit, 18L or 18R. Camber is the front camber of the wheels of the automotive vehicles. D is the distance from the center of the tire to slit 78 of optical bench 70. B is the distance from the spindle to light sensor 72. Cam_drop is the vertical drop of a head unit caused by camber. Camber affects vl and vr. Corrected values for vl and vr due to camber, vl' and vr', are calculated as follows:

$$\text{cam\_drop} = D \times \sin(\text{camber}) + B \times [1 - \cos(\text{camber})] \quad \text{Eq9}$$

$$vl' = vl - (LF\text{cam\_drop} - RF\text{cam\_drop}) \quad \text{Eq10}$$

$$vr' = vr - (RF\text{cam\_drop} - LF\text{cam\_drop}) \quad \text{Eq11}$$

Where LFcam_drop is the cam-drop value calculated for the left front wheel 12L and RFcam_drop is the cam_drop value calculated for the right front wheel 12R.

Knowing the values for vl' and v' allows vertical entrance angles (RFvert and LFvert) to be calculated. These angles define the paths of the light signals from light sources 68 to light sensors 72 in the vertical plane. The vertical entrance angle can be derived using the right triangle formed by T, the tread width, and vertical offset distances vr' and vl'. The equations are:

$$RFvert = \arctan(vr'/T)$$

$$LFvert = \arctan(vl'/T)$$

Adding the camber angle to the vertical entrance angle yields the angle at which the light signal from light source 68 enters slit 78. This angle is RFent for the right front entrance and LFent for the left front entrance. These angles can be calculated using the formulas:

$$RFent = RFvert + RFcamber \quad \text{Eq14}$$

$$LFent = LFvert + LFcamber \quad \text{Eq15}$$

Using the entrance angle, the distance from the center of slit 78 to the point of entrance of the signal from light source 68 can be calculated. This distance tells how much offset is caused by the movement of slit 78 due to rotation of head unit 18L or 18R. $X_r$ is the distance from slit 78 on head unit 18R to source 68 on head unit 18L. $X_l$ is the distance from slit 78 on head unit 18L to source 68 on head unit 18R. $X_r$ and $X_l$ calculated using the formulas:

$$X_r = S \times \tan(RFent) \quad \text{Eq16}$$

$$X_l = S \times \tan(LFent) \quad \text{Eq17}$$

Where S is the distance between slit 78 and CCD 72, typically about 2 and ⅜ inches.

Figure 9:
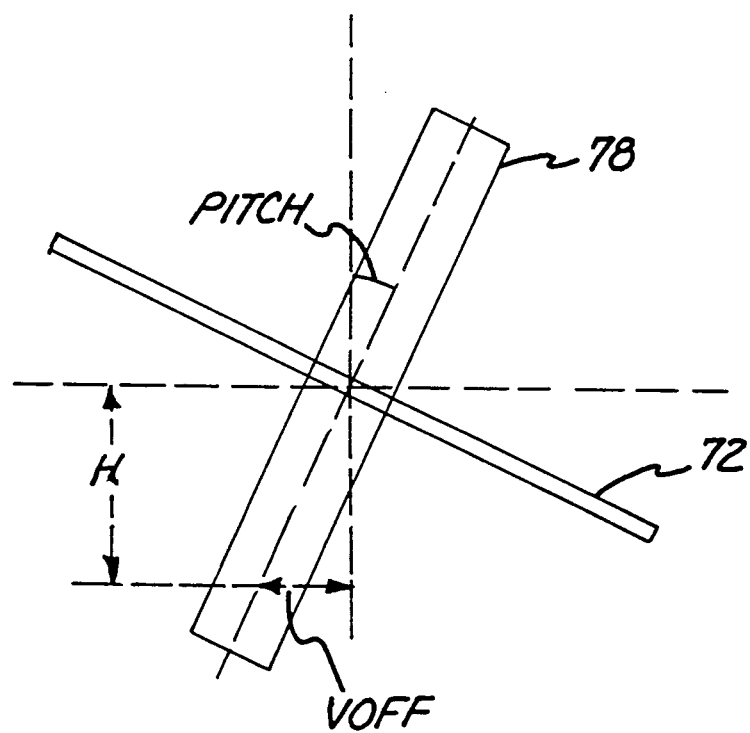
FIG. 9 is a plan view of a slit and a light sensor used in an angle sensor in accordance with the present invention.

FIG. 9 is a front view of slit 78 and sensor 72. H is the distance from the vertical center of slit 78 to the point at which the signal enters slit 78. Voff is the vertical offset distance of the signal from light source 68 entering slit 78. Pitch is the pitch of the head unit, rfpitch for head unit 18R and lfpitch for head unit 18L. Knowing H and the pitch angle, the vertical offset distance, voff, can be calculated for each head unit 18L and 18R. This distance can be converted to an angle by multiplying by a constant, K, with units of degrees/inch. The vertical offset for left and right head units 18L and 18R can be calculated using the formulas:

$$voff\_r = H_r \times \tan(rfpitch) \times K \quad \text{Eq18}$$

$$voff\_l = H_l \times \tan(lfpitch) \times K \quad \text{Eq19}$$

Because CCD 72 is tilted, its effective gain increases. This can be corrected by multiplying the toe reading by the cosine of the pitch angle for the head unit, 18L or 18R. Doing this projects the toe reading onto a zero degree pitch plane.

CROSS-TOE COMPENSATION FORMULAS

The compensation formulas for left and right front head unit pitch use hoff_l, voff_l, hoff_r, and voff_r. The gain correction factors are also included. The correction formulas for left and right front toe readings are as follows:

$$LFtoe' = LFtoe \times \cos(lfpitch) - hoff\_l - voff\_l \quad \text{Eq20}$$

$$RFtoe' = RFtoe \times \cos(rfpitch) - hoff\_r - voff\_r \quad \text{Eq21}$$

Where LFtoe' and RFtoe' are corrected left and right front toe angles, and LFtoe and RFtoe are uncorrected values.

In operation, an operator inputs parameters, such as tread width, for the automobile being tested into controller 82 in FIG. 3. This may be by inputting the make and model of the automobile if controller 82 keeps the parameters for various automobiles in storage. The operator connects left and right front head units 18L and 18R to the left and right front wheels 12L and 12R of the automobile. Controller 82 receives data from left to right pitch sensors 84L and 84R which indicate the pitch of the left and right head units 18L and 18R from the horizontal plane. Left and right cross-toe measurements are made using light source 68 and sensor 72, shown in FIG. 2. Controller 82 measures camber uncorrected cross-toe. Uncorrected cross-toe measurements are used to calculate individual toe for each front wheel 12R and 12L. In prior art wheel alignment systems, typically uncorrected cross-toe is displayed. Controller 82 uses the parameters input through input device 34 and data from the left and right front cross-toe measurements to calculate the corrected values for left and right cross-toe as described in equations 20 and 21. Controller 82 then displays the correct values for left and right front cross-toe on display 38.

CONCLUSION

The present invention provides a method and apparatus for compensating for errors in cross-toe measurements in an automobile wheel alignment system which arise due to left and right front head units which are not in alignment with the horizontal plane. Using the present invention, the left and right front head units can be angled to avoid obstacles which may block the path of the light beam between the left and right front head units. Furthermore, using the present invention, it is not necessary for the operator to level the left and right front head units in the horizontal plane to obtain accurate cross-toe measurements.

Although the present invention has been described with reference to preferred embodiments, workers skilled in the art will recognize that changes may be made in form and detail without departing from the spirit and scope of the invention. For example, although the present invention has been described with reference to angle sensors which use a light emitting diode, a slit and a CCD, other types of angle sensors which use light beams or mechanical connections may also be used in obtaining cross-toe measurements. Similarly, other types of pitch sensors may also be employed. Also, although cross-toe measurements were shown for the front wheels, in some cases cross-toe is measured for the rear wheels. The present invention is applicable to rear cross-toe measurements as well.

What is claimed is:

1. A system for measuring an angular relationship of wheels of a vehicle comprising:
   a first head unit for mounting to a first wheel of the vehicle;
   a second head unit for mounting to a second wheel of the vehicle;
   an angle sensor connected to the first and the second head units for sensing an angular relationship between the first and second head units and providing an angle sensor output;
   a pitch sensor connected to the first head unit for sensing an angle between the first head unit and a horizontal plane referenced to ground and providing a pitch sensor output; and
   controller means connected to the angle sensor and the pitch sensor for calculating a cross-toe angle based upon the angle sensor output and the pitch sensor output.

2. The system of claim 1 wherein the controller means includes means for calculating a horizontal separation correction factor based upon the pitch sensor output and a horizontal separation distance between the first head unit and the second head unit.

3. The system of claim 2 wherein the first head unit includes a light sensor, a light source, and a spindle adapted for mounting on a wheel of the vehicle, the second head unit includes a light sensor, a light source and a spindle adapted for mounting onto a wheel of the vehicle, wherein the means for calculating a horizontal separation correction factor comprises means for calculating a horizontal separation correction factor based upon: a distance between the light sensor of the first head unit and the spindle of the first head unit; a distance between the light source of the first head unit and the spindle of the first head unit; a distance between the light sensor of the second head unit and the spindle of the second head unit; a distance between the light source of the second head unit and the spindle of the second head unit; and the pitch of the first and second head units.

4. The system of claim I including means for calculating a vertical separation correction factor based upon the pitch sensor output and a vertical separation distance between the first head unit and the second head unit.

5. The system of claim 4 wherein the first head unit includes a light sensor, a light source, and a spindle adapted for mounting on a wheel, the second head unit includes a light sensor, a light source and a spindle adapted for mounting onto a wheel of a vehicle, wherein the means for calculating a vertical separation correction factor comprises means for calculating a vertical separation based upon a distance factor between the light sensor of the first head unit and the light source of the second head unit, the light source of the first head unit and the light sensor of the second head unit.

6. The system of claim 4 and further including means for calculating a camber component of the vertical separation correction factor based upon the pitch sensor output and camber angles of the first and second head units.

7. The system of claim 6 including means for calculating camber angles of wheels of the vehicle for use in calculating the camber component of the vertical separation correction factor.

8. The system of claim 1 wherein the first head unit includes a light sensor, a light source, and a spindle adapted for mounting on a wheel of the vehicle, the second head unit includes a light sensor, a light source and a spindle adapted for mounting onto a wheel of the vehicle, wherein the light sensor includes a slit, and further including means for calculating a vertical entry angle into the slit.

9. A method for measuring an angular relationship of the wheels of a vehicle comprising:
   measuring a cross-toe angle between two of the wheels of the vehicle using a first head unit and a second head unit;
   correcting the cross-toe angle measurement based upon pitch angles of the first head unit relative to a first horizontal plane which is referenced to ground and second head unit relative to a second horizontal plane which is referenced to ground.

10. The method of claim 9 wherein correcting the cross-toe angle measurement includes calculating a horizontal separation correction factor based upon pitch angles of the first and second head units and a horizontal separation distance between the first head unit and the second head unit.

11. The method of claim 10 wherein measuring cross-toe comprises measuring an angle between a light source on the first head unit and a light sensor on the second head unit, and measuring an angle between a light source attached to the second wheel unit and a light sensor attached to the first wheel unit.

12. The method of claim 11 wherein the first and second head units each include a spindle and calculating a horizontal separation correction factor comprises calculating a horizontal factor based upon: a distance between the light sensor of the first head unit and the spindle of the first head unit; a distance between the light source of the first head unit and the spindle of the first head unit; a distance between the light sensor of the second head unit and the spindle of the second head unit; a distance between the light source of the second head unit and the spindle of the second head unit; and pitch of the first and second head units.

13. The method of claim 9 wherein the step of correcting cross-toe measurements includes calculating a vertical separation correction factor based upon pitch angles of the first and second head units and a vertical separation distance between the first head unit and the second head unit.

14. The method of claim 13 wherein measuring cross-toe comprises measuring an angle between a light source on the first head unit and a light sensor on the second head unit, and measuring an angle between a light source attached to the second wheel unit and a light sensor attached to the first wheel unit.

15. The method of claim 14 wherein calculating a vertical separation correction factor includes calculating a vertical separation correction factor based upon a vertical separation distance between the light sensor of the first head unit and the light source of the second head unit and a vertical separation distance between the light source of the first head unit and the light sensor of the second head unit.

16. The method of claim 13 wherein calculating a vertical separation correction factor includes calculating a camber component of a vertical separation correction factor based upon pitch angles of the first and second head units and camber angles of wheels of the vehicle.

17. The method of claim 16 including the calculating camber angles of wheels of the vehicle for use in calculating the camber component of the vertical separation factor.

18. A system for measuring an angular relationship of wheels of a vehicle comprising:
a first head unit;
a second head unit;
an angle sensor connected to the first and the second head units for sensing an angular relationship between the first and second head units and providing an angle sensor output; and
means connected to angle sensor for calculating a cross-toe angle based upon the angle sensor output and at least one other measured angular relationship measured relative to a head unit which effects accuracy of the angle sensor output.

19. The system of claim 18 wherein the other measured angular relationship which effects accuracy of the angle sensor output comprises pitch angles of the first and second head units relative to a horizontal plane which is referenced to ground.

20. The system of claim 18 wherein the first head unit and the second head unit includes means, connected to the means for calculating, for sensing the pitch of the first and the second head units relative to a horizontal plane.

21. The system of claim 18 wherein the other measured angular relationship which affects accuracy of the angle sensor output comprises camber angles of the first wheel and the second wheel of the vehicle.

22. A system for measuring the angular relationship of wheels of a vehicle comprising:
a first head unit for mounting to a first wheel of the vehicle, comprising:
a first wheel for mounting to the first wheel;
a first arm having a distal end, a proximal end, and a length, the proximal end connected to the first wheel mount, the first arm extending in a horizontal plane generally perpendicular to an axis of rotation of the first wheel;
a first angle sensor connected to the first arm at the distal end of the first arm for sensing an angular relationship;
a first pitch sensor coupled to the first arm for sensing a first pitch angle of the first arm with a horizontal plane which is referenced to ground;
a second head unit for mounting to a second wheel of the vehicle, comprising:
a second wheel mount for mounting to the second wheel;
a second arm having a distal end, a proximal end, and a length, the proximal end connected to the second wheel mount, the second arm extending in a horizontal plane generally perpendicular to an axis of rotation of the second wheel;
a second angle sensor connected to the second arm at the distal end of the second arm for sensing an angular relationship;
a second pitch sensor coupled to the second arm for sensing a second pitch angle of the second arm with a horizontal plane which is referenced to ground;
means connected to the first head unit and the second head unit for calculating toe angle measurements of the first wheel and of the second wheel based upon outputs from the first and second angle sensors; and
means for correcting errors introduced into toe angle measurements due the length of the first arm and the length of the second arm based upon the first pitch angle and the second pitch angle.

* * * * *

UNITED STATES PATENT AND TRADEMARK OFFICE
CERTIFICATE OF CORRECTION

PATENT NO. : 5,056,233

DATED : October 15, 1991

INVENTOR(S) : Dennis L. Hechel et al.

It is certified that error appears in the above-identified patent and that said Letters Patent is hereby corrected as shown below:

Col. 9, line 55, delete "claim I" and insert --claim 1--.

Signed and Sealed this

Sixteenth Day of March, 1993

Attest:

STEPHEN G. KUNIN

*Attesting Officer*    *Acting Commissioner of Patents and Trademarks*